United States Patent
Fenwick et al.

(10) Patent No.: US 7,484,963 B2
(45) Date of Patent: Feb. 3, 2009

(54) CONNECTOR ARRANGEMENTS ON A POWER SUPPLY UNIT

(75) Inventors: Stephen C. Fenwick, Mountain View, CA (US); John DiFonzo, San Mateo, CA (US); Tang Yew Tan, San Francisco, CA (US); Brian J. Girvin, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 565 days.

(21) Appl. No.: 11/174,226

(22) Filed: Jun. 30, 2005

(65) Prior Publication Data

US 2007/0085516 A1 Apr. 19, 2007

(51) Int. Cl.
*H01R 39/00* (2006.01)
*G06F 1/00* (2006.01)
(52) U.S. Cl. .......................................... 439/1; 713/300
(58) Field of Classification Search ................. 713/300; 439/1
See application file for complete search history.

(56) References Cited

U.S. PATENT DOCUMENTS

| 5,905,442 | A * | 5/1999 | Mosebrook et al. ........... 340/3.7 |
| 5,923,099 | A * | 7/1999 | Bilir ............................. 307/64 |
| 6,912,651 | B1 * | 6/2005 | Hamdi et al. .................. 713/1 |
| 7,050,794 | B2 * | 5/2006 | Chuey et al. ................. 455/418 |
| 7,152,175 | B2 * | 12/2006 | Madany et al. ............... 713/340 |
| 2003/0074489 | A1 * | 4/2003 | Steger et al. ................... 710/1 |
| 2005/0010323 | A1 * | 1/2005 | Cocciadiferro et al. ...... 700/174 |
| 2007/0126576 | A1 * | 6/2007 | Script et al. .............. 340/545.5 |

\* cited by examiner

*Primary Examiner*—Shawn Riley
(74) *Attorney, Agent, or Firm*—IP Strategy Group, P.C.

(57) ABSTRACT

The invention relates, in an embodiment, to a power supply module configured to be coupled to a power outlet to supply an operating voltage to a data processing device. The power supply module includes a set of signal connectors having at least a first signal connector. The set of signal connectors is configured to provide at least a portion of data received from the data processing device to devices external to the data processing device, whereby the power supply module is disposed in a flexibly-coupled, spaced-apart relationship relative to the data processing device.

29 Claims, 10 Drawing Sheets

CONNECTOR ARRANGEMENTS ON A POWER SUPPLY UNIT

BACKGROUND OF THE INVENTION

Progress in technology has resulted in a proliferation of data processing devices, both portable and non-portable, to support modem society's ever increasing need to transmit and receive data. Examples of data processing devices include, but are not limited to, personal computers, laptop computers, routers, cameras, game consoles, and personal digital assistants (PDA's). To enable the transmission of data between a data processing device and one or more external data sources (such as external stand-alone data devices and/or external data networks), a plurality of connectors are typically disposed on the data processing device.

As discussed herein, a connector is an input/output component that is designed to facilitate the physical connection and/or disconnection of the data transmission medium through which data signals are transmitted. For example, since USB signals are typically transmitted via a plurality of conductors, a USB connector associated with a data processing device may include a plurality of conductive pins for coupling with respective conductive pins of another USB connector that may be associated with another electronic device. As another example, since a high-end router may transmit SONET (Synchronous Optical Network) data via an optical fiber, a SONET connector associated with that high-end router may include the optical coupling for receiving an optical fiber plug. Examples of other connectors may include, but are not limited to, Ethernet connectors, Firewire connectors, video connectors, and the like.

Figure 1A:
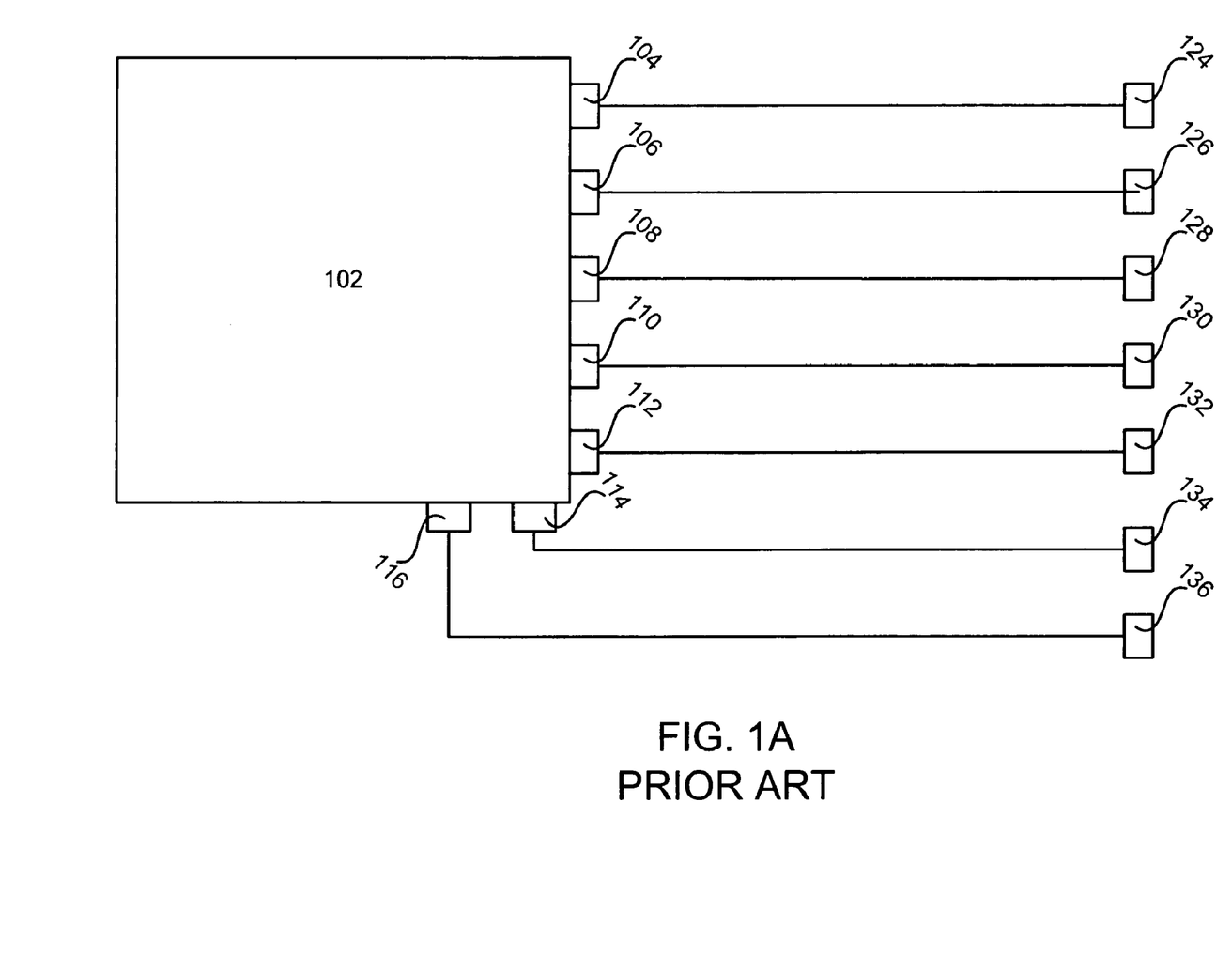
FIG. 1A shows a data processing device having a plurality of connectors.
Figure 2:
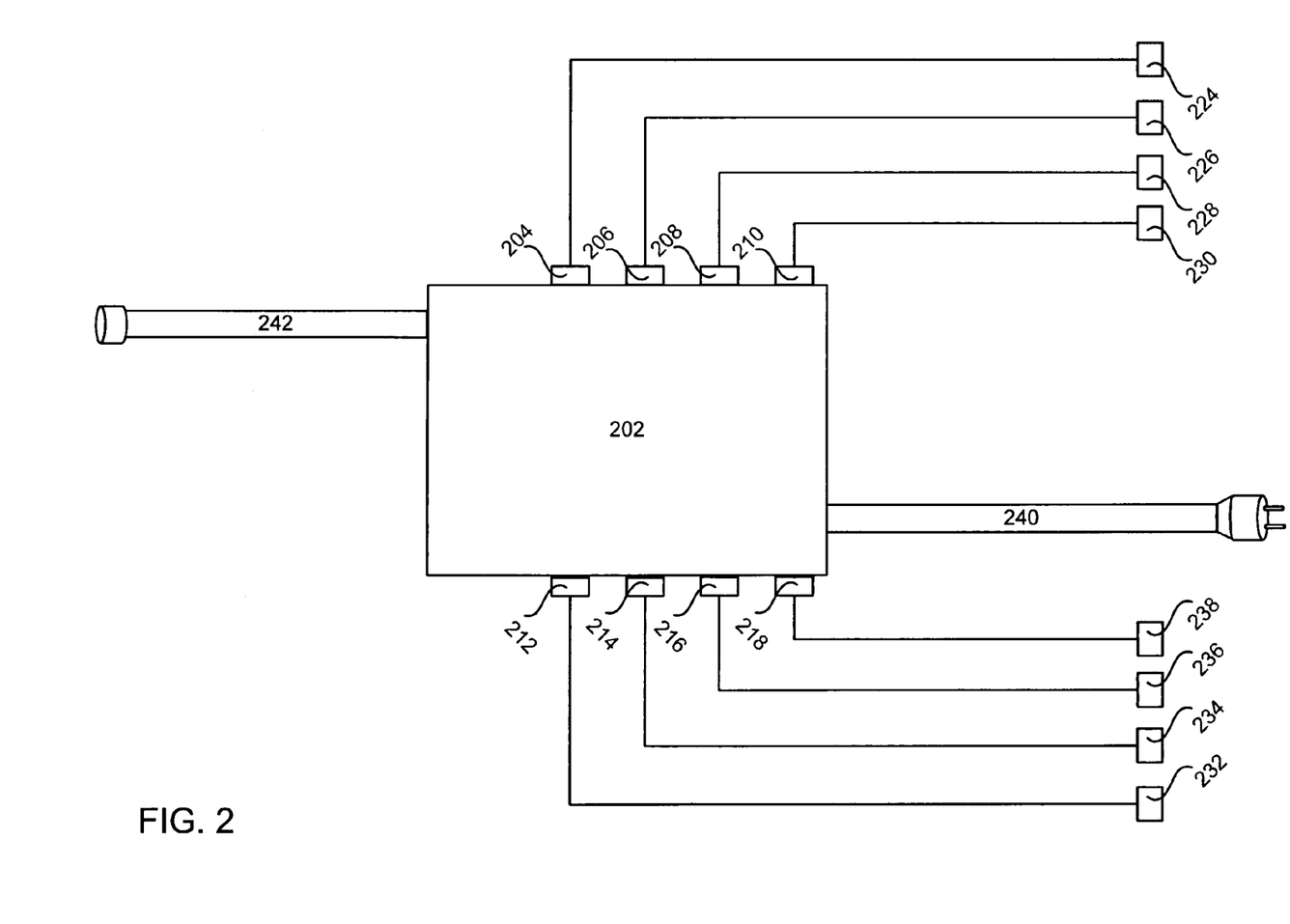
FIG. 2 illustrates, in an embodiment, an example of an integrated power supply module (IPSM) that is external to a data processing device.

To facilitate discussion, FIG. 1A shows a data processing device having a plurality of connectors. A data processing device 102 is illustrated in FIG. 1A as having a plurality of connectors (104, 106, 108, 110, 112, 114, 116) that are capable of supporting different protocols. In the example of FIG. 1A, the laptop 102 is connected to the Internet (e.g., via Ethernet wall socket 128) via an Ethernet connector 108. Laptop 102 may also connect to a flash drive 124 and a keyboard 126 via USB connectors 104 and 106 respectively. Laptop 102 may also connect to a camcorder 130 via a Firewire connector 110, to a printer 132 via a parallel connector 112, to a monitor 136 connected via a video connector 116, and to a power supply unit 134 connected via a power connector 114. The connectors, protocols, and external devices shown in FIG. 2 are only representative, are shown in a symbolic manner, and are not meant to be limiting.

There are several disadvantages with having to provide connectors directly onboard the data processing device. For example, since the data processing device has a finite physical form factor (i.e., size), there is a limit to the number of connectors that can be physically provisioned on the data processing device. As data processing devices become smaller and smaller, fewer connectors can be placed on the data processing device. This limit on the number of available connectors places a constraint on the number and types of external devices and/or external data sources that the data processing device can interoperate with.

Even if the data processing device can accommodate all the needed connectors, the presence of the multitude of connectors and associated cables may result in what many users term a "cable mess." Since the data and power cables terminate at the connectors on the data processing device, the cable mess generally ends up in the vicinity of the data processing device. If the data processing device is a consumer-oriented device, such as a laptop computer or a desktop computer, the cable mess typically ends up the user's work space, typically on or near the user's desk itself.

Another disadvantage exists when a data processing device is portable (e.g., a laptop computer). Since the portable data processing device is meant to be transported among various locations, the need to connect and disconnect the plurality of cables to/from their respective onboard connectors (i.e., connectors provided onboard the portable data processing device) inconveniently imposes a recurring, manual, and possibly time-consuming task on the user at each new location. Some users also find the need to carry different cables (to ensure that connections to the different connectors can be made in case some cables may be missing at some locations) a cumbersome chore.

Figure 1B:
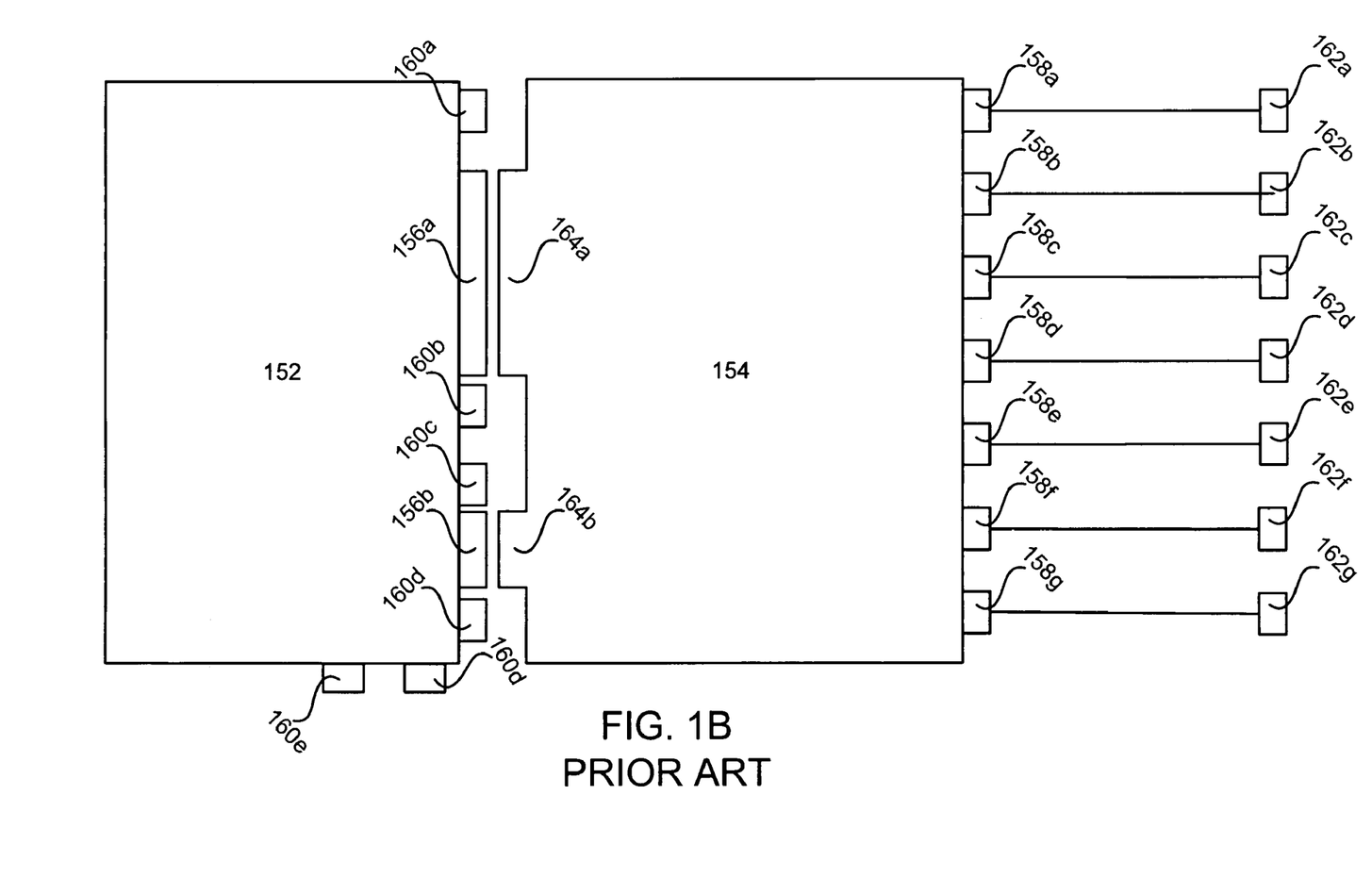
FIG. 1B shows an example scenario wherein a portable data processing device connected to an example docking station.

To simplify the task of connecting and disconnecting a large number of cables from the portable data processing device, some manufacturers provide a docking station for use with the portable data processing device. To facilitate discussion, FIG. 1B shows an example scenario wherein a portable data processing device connected to an example docking station. A portable data processing device 152 may be detachably connected to a docking station 154 via special docking connectors 156a and 156b. In a typical scenario, the portable data processing device is rigidly docked (hence the term "docking station") to the docking station when data transmission is desired.

The special connectors 156a and 156b on portable data processing device 152 aggregate, either logically or physically, various I/O ports that may be required on a non-docking data processing device to support the multitude of protocols. Accordingly, a large number of protocols and external data sources may be supported with fewer docking connectors disposed on the portable data processing device 152.

To facilitate the transmission of data between portable data processing device 152 and external data sources and/or external data networks, a plurality of connectors (158a, 158b, 158c, 158d, 158e, 158f, and 158g) are provided on docking station 154. These connectors (158a, 158b, 158c, 158d, 158e, 158f, and 158g) may be similar to the connectors (160a, 160b, 160c, 160d, and 160e) that are currently provided on portable data processing device 152. However, since docking station 154 is meant to be stationary, the coupling of portable data processing device 152 to the connectors (158a, 158b, 158c, 158d, 158e, 158f, and 158g) typically involves snapping or "docking" portable data processing device 152 to docking station 154 to allow docking connector 156a on portable data processing device 152 to mate with a respective docking connector 164a on docking station 154, as well as to allow docking connector 156b on portable data processing device 152 to mate with a respective docking connector 164b on docking station 154.

Once the docking connectors 156a/164a and 156b/164b are connected, portable data processing device 152 can transmit and receive data with the external data devices and network connections (e.g., 162a, 162b, 162c, 162d, 162e, 162f, and 162g).

There are several disadvantages associated with the use of a docking station. For example, a docking station is a bulky device and may occupy a sizeable portion of the user's limited workspace. For some users, the requirement of placing another bulky electronic device on their already limited workspace is unacceptable or is only grudgingly tolerated. Further, the clutter on the user's desk has not been eliminated. The cables have simply been relocated to the docking station instead of at the portable processing device. In most cases, the cable mess still ends up on the user's desk since the user needs to have access to his laptop computer on his desk, and the docking paradigm requires the docking station and its attendant on-board connectors (along with the concomitant cable mess) be on the user's desk to facilitate docking.

Further, unless the user is willing to incur the expense of buying and keeping/maintaining a docking station at each location that the user may visit, the user still cannot entirely escape the manual, time-consuming task of having to connect and disconnect the multitude of cables from his portable data processing device. In locations where a docking station is not available, the user is forced to revert to the manual, time-consuming method of connecting and disconnecting individual cables from their onboard connectors.

SUMMARY OF INVENTION

The invention relates, in an embodiment, to a power supply module configured to be coupled to a power outlet to supply an operating voltage to a data processing device. The power supply module includes a set of signal connectors having at least a first signal connector. The set of signal connectors is configured to provide at least a portion of data received from the data processing device to devices external to the data processing device, whereby the power supply module is disposed in a flexibly-coupled, spaced-apart relationship relative to the data processing device.

In another embodiment, the invention relates to a method for transmitting data between a data processing device and a plurality of external devices that employ a plurality of protocols for data transfer. The method includes providing a power supply module. The power supply module is external to the data processing device and configured to be coupled to a power outlet to supply at least one operating voltage via a first flexible conductor to the data processing device. The operating voltage is different from a voltage associated with the power outlet. The power supply module is disposed in a flexibly-coupled, spaced-apart relationship relative to the data processing device. The power supply module further has a plurality of connectors configured for coupling with the plurality of external devices. The method also includes transmitting the data from the data processing device to the plurality of connectors on the power supply module, thereby enabling the data to be transmitted to the plurality of plurality of external devices via the plurality of connectors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided an integrated power supply module (IPSM) that provides the operating voltage(s) to the data processing device, i.e., the set of voltages adapted to operate circuitry within the data processing device (DPD), as well as data signals associated with the data communication between the data processing device and the external data sources. Furthermore, in embodiments of the invention, the data and power connections between the IPSM and the data processing device are accomplished in a manner such that the IPSM and the data processing device are in a spaced-apart relationship and utilizing a flexible connection medium (e.g., the data connection portion may be accomplished via a set of flexible conductors and/or via flexible optical fibers and/or via the wireless medium).

For illustration purposes, consider for example the laptop computer situation. In the prior art, the power adapter is employed to transform household voltage and current into a set of voltages for use by circuitry within the laptop computer.

For data communication, different cables connect to on-board data connectors to allow the laptop computer to communicate with external power sources. The result is, as discussed, a multiplicity of tedious connections to the laptop computer and the aforementioned "cable mess."

In an embodiment, the IPSM represents an enhanced version of the ubiquitous power adapter that is used to power devices (e.g., data processing devices) from household power outlets. These data processing devices include but are not limited to laptop computers, desktop computers, PDAs, cordless phones, cellular phones, and video game console. Further, the data processing devices may be portable or intended to be stationary. In this document, various implementations may be discussed using a laptop as an example data processing device. The invention is however not limited to laptop computers and may be employed with any suitable data processing device.

In the prior art laptop scenario, the power adapter is interposed along the power supply path between the industry-standard power source (i.e., wall power outlet) and the laptop computer. In embodiments of the invention, the enhanced power adapter is interposed not only along the power supply path but also along the data communication path. In other words, the IPSM is disposed in between the laptop computer and the industry standard data connectors that are employed to communicate with the external data sources.

The IPSM is thus, in an embodiment, disposed in a flexibly-coupled, spaced-apart relationship relative to the data processing device. Being flexibly coupled (e.g., via one or more flexible conductors) and spaced-apart (i.e., the IPSM is not required to be inflexibly disposed immediately adjacent to the data processing device as in the case of the docking station), the IPSM may be placed anywhere convenient and/or unobtrusive in the vicinity of the user's workspace and still can provide data connection and/or power connection to the data processing device.

With the IPSM being interposed in the data communication path between the laptop computer and industry standard connectors (and the attendant numerous cables that are coupled thereto), the data connection between the IPSM and the laptop computer (representing an example of a data processing device in this case) can be tailored for ease of connection/disconnection, as well as for cable clutter reduction. On the other hand, the data connectors between the IPSM and the rest of the external world may be made via industry-standard connectors and communication protocols to preserve interoperability.

In embodiments of the invention, the data connection between the IPSM and the data processing device may be accomplished using higher speed data connections and fewer connectors. Since the distance between the IPSM and the data processing device (DPD) is typically quite close, e.g., as close as a few feet to accomplish moving the multitude of industry standard connectors and the cables coupled thereto away from the immediate workspace of the user, a higher speed data connection may be employed without concern for transmission loss and other data transmission-related issues that limit data transmission rates. In fact, the short distance between the DPD and the IPSM makes it possible to employ high speed protocols that utilize the conductive medium, the optical medium, and/or the wireless medium, which high speed protocols would have been impractical over longer distances. Fewer connectors between the data processing device and the IPSM may be employed since the IPSM-DPD connections may be optimized for connection/disconnection efficiency, leaving the interoperability issues between the IPSM and the external data sources to be handled by the logic circuitry and industry-standard connectors of the remotely located IPSM.

To further elaborate, consider the situation wherein, for example, USB, Firewire, and Ethernet data are sent from a data processing device to different external data sources. The USB, Firewire, and Ethernet data may be transformed to a higher speed protocol, such as gigabit or multi-gigabit Ethernet for transmission using a short, flexible Ethernet cable (which may be physically bundled together with the power cable, for example) to the IPSM. Other alternative high speed protocols (such as high speed Firewire) may be employed. Alternatively or additionally, the USB, Firewire, and Ethernet data may be transformed to a higher speed wireless protocol for transmission to the IPSM. At the IPSM, the high speed data is transformed back to the constituent USB, Firewire, and Ethernet data streams to be forwarded to the destination external data sources via industry-standard USB, Firewire, and Ethernet connectors that are provided with the IPSM.

It should be appreciated that since the power adapter is a device that is typically carried by the user when the data processing device (such as the laptop computer) is moved, the integration of data transmission capability into the power adapter advantageously does not impose a requirement for the user to carry any additional piece of equipment that the user has not already carried. Furthermore, such integration does not result in the imposition of an additional piece of equipment into the user's crowded workspace since the IPSM also provides the traditional power adaptor function. Since the IPSM is flexibly coupled to the data processing device in a spaced-apart relationship, the multitude of industry-standard connectors and the concomitant mass of cables that connect thereto are effectively removed from the user's immediate workspace (e.g., the user's desk). This is unlike the situation in the prior art wherein the docking station, with its rigid docking paradigm, needs to be present on the user's desk.

In an embodiment, the IPSM provides the data connection and the power connection via two different sets of conductive cables. To further reduce clutter, these sets of conductive cables may be physically bundled together as much as possible to reduce tangling and to improve visual aesthetics. In the IPSM, a first set of circuitry enables the operating voltage (s) to be transmitted from the IPSM to the data processing device via a first set of cables. A second set of circuitry in the IPSM enables data to be transmitted and received over a second set of high speed data transmission cables. As mentioned, data from the DPD or from the external data sources may first be transformed to a higher speed protocol from their native constituent protocols in order to facilitate the high speed DPD-IPSM data transmission.

In another embodiment, the same set of conductors may be employed to carry both power and the high speed data between the IPSM and the DPD, with the high speed data being modulated (e.g., frequency or amplitude modulated) to enable the high speed data to be transmitted over the power conductors. In this embodiment, a modulator/demodulator may be installed in both the data processing device and the IPSM. Data is modulated by the modulator prior to being transmitted. Once received, the demodulator separates the data signal from the power signal.

In an embodiment, the data path between the data processing device and the IPSM may be wireless as mentioned. On both the data processing device and the IPSM are transceivers and modulators/demodulators that are configured to transmit and receive data wirelessly. Data is modulated by the modulator prior to being transmitted wirelessly between the IPSM and the DPD. Once received, the demodulator recovers the data from the wireless signals.

In yet another embodiment, the data processing device may be connected to the IPSM via a hybrid connection. The hybrid connection allows the data processing device transmit high speed data to the IPSM via the conductive and/or optical medium when the IPSM is coupled with the DPD. When the IPSM is decoupled from the DPD, the high speed data between the DPD and the IPSM may be accomplished wirelessly.

The features and advantages of the invention may be better understood with reference to the figures and discussions that follow. In an embodiment, FIG. 2 illustrates an example of an integrated power supply module (IPSM) that is external to a data processing device. On an IPSM 202 are industry-standard signal connectors (204, 206, 208, 210, 212, 214, 216, and 218) that may traditionally be disposed on the data processing device.

These industry-standard signal connectors allow the data processing device and a plurality of external data sources to transfer data in a manner that promotes interoperability between IPSM 202 (and by extension, the DPD) and a variety of external data sources. In the example of FIG. 2, USB connectors 204, 206, 208 and 210 enable USB devices 224, 226, 228, and 230 (e.g., flash drive, hard drive, scanner, and keyboard) to communicate with IPSM 202 using industry-standard USB protocols. Also, signal connector 212 enables an Ethernet data source 232 (e.g., Internet) to be exchange data with IPSM 202 using an Ethernet protocol. As another example, signal connector 214 enables a Firewire device 234 (e.g., camcorders) to exchange data with IPSM 202 using a Firewire protocol. As yet another example, signal connector 216 enables a parallel port device 236 (e.g., printer) to be connected to IPSM 202 using a parallel communication protocol. As a further example, signal connector 218 enables a video/DVI connection 236 (e.g., TV connection) to IPSM 202 using a DVI protocol.

IPSM 202 also has a set of conductors 240, which couples IPSM 202 to a power outlet. Power circuitry within IPSM 202 transforms the power outlet voltage into different operating voltage(s) configured to operate circuitry within the DPD. IPSM 202 supplies power at the DPD operating voltage(s) via a set of flexible conductors 242. Flexible conductors 242 have a non-zero length, thereby enabling the DPD and the IPSM to be connected in a flexible, spaced-apart relationship. Data processing circuitry within IPSM 202 enable IPSM 202 to interpose in between the data path between the DPD and the industry-standard connectors (e.g., 204, 206, 208, 210, 212, 214, 216, and 218). In some embodiments, flexible conductors 242 are also employed to transfer data between IPSM 202 and the DPD (not shown in FIG. 2). The data may be carried on the same individual conductors that also carry power or may be carried on different conductors within flexible conductors 242. In other embodiments, flexible conductors 242 are employed to carry power to the DPD, with the data being transferred wirelessly between IPSM 202 and the DPD. In other embodiments, flexible conductors 242 implement a hybrid data/power connection, with data being transferred via flexible conductors 242 when IPSM 202 is coupled to the DPD. When IPSM 202 is decoupled from the DPD, data is transferred wirelessly between the DPD and the IPSM 202. These various implementations and others are discussed in greater details in the following figures.

Figure 3:
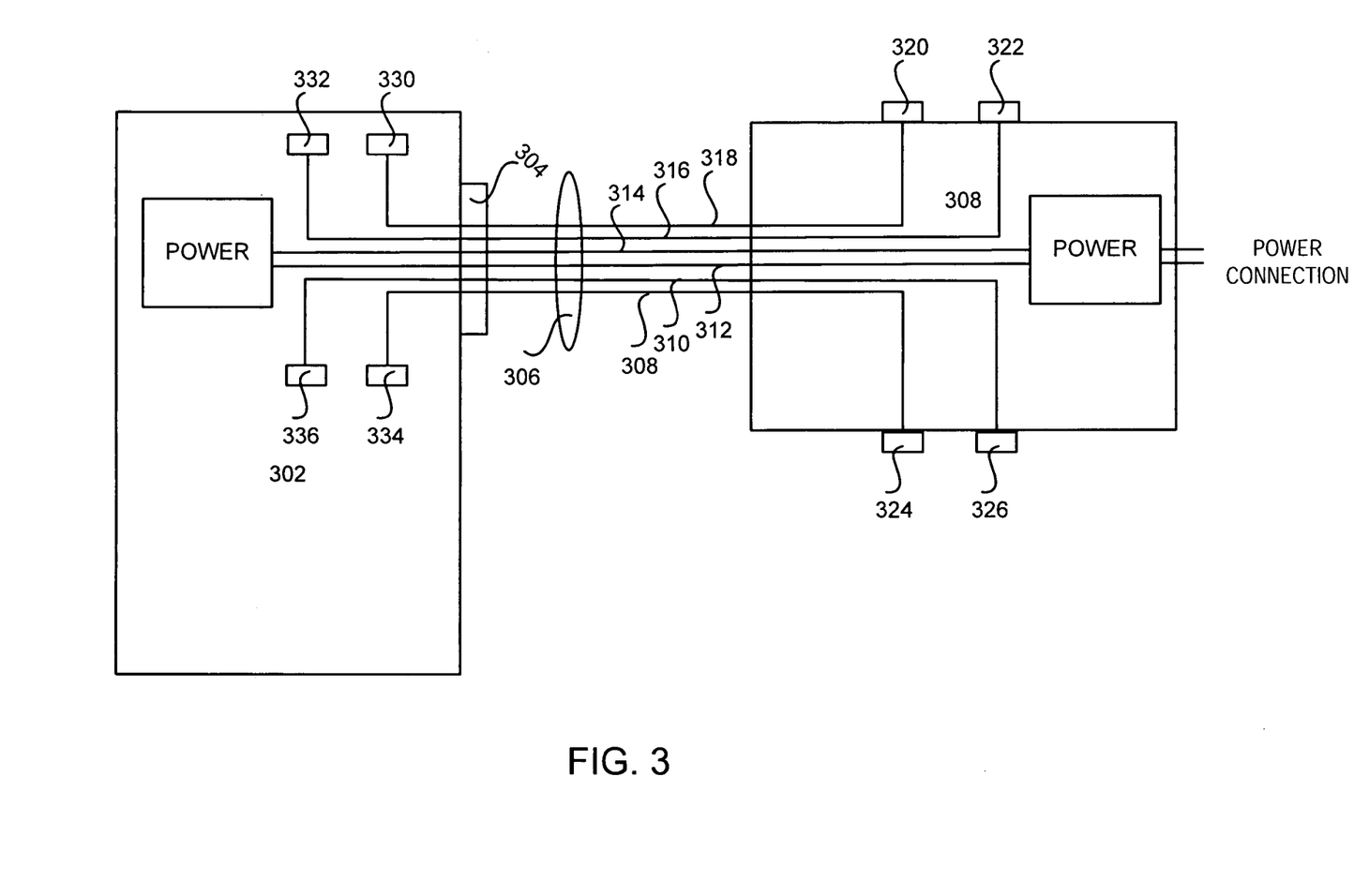
FIG. 3 shows, in an embodiment, a data processing device connected to an IPSM by a set of flexible conductors 306 that bundles individual conductors together.

FIG. 3, in an embodiment, shows a data processing device connected to an IPSM by a set of flexible conductors 306 that bundles individual conductors together. Located on a data processing device 302 is a connector 304, which allows the set of flexible conductors 306 to connect an IPSM 308. Within the set of flexible conductors 306 is a plurality of individual conductors (308, 310, 312, 314, 316 and 318). Some of individual conductors are dedicated to data transmission, with other individual conductors being dedicated to supply power to the DPD 302. Of the data transmission conductors, there may be different subsets of port-specific and/or protocol-specific conductors, with each subset being configured to transmit data associated with a particular port and/or a particular protocol.

In the embodiment of FIG. 3, no data conversion may be needed since the data is transferred between DPD 302 and IPSM 308 using their native protocols. However, the data is transmitted between DPD 302 and IPSM 308 using fewer physical connectors (e.g., a single integrated power/data connector 304 in this example) than would normally be required to transmit data from different ports/protocols of the DPD. In an example, single connector 304 may involve a male part and a female part to facilitate detachable coupling, with each part having sufficient matable pins to accommodate data transmission for the various ports associated with DPD 302. Note that since the different connectors are integrated to improve usability, different pins of connector 304 may well carry data associated with different ports/protocols. It should also be mentioned that although a single connector 304 is employed in FIG. 3, a reduced set of connectors having more than one physical connector may well be employed.

At IPSM 308, the subsets of data conductors are coupled to their respective industry-standard connectors to allow DPD 302 to communicate to external data sources using industry-standard connectors and protocols. For example, the subset of conductors represented by reference number 318 may carry USB data from a USB port 330 of DPD 302 and these conductors may be connected to a USB connector 320 on IPSM 308. As another example, the subset of conductors represented by reference number 316 may carry USB data from another USB port 332 of DPD 302 and these conductors may be connected to a different USB connector 322 on IPSM 308. As yet another example, the subset of conductors represented by reference number 310 may carry Firewire data from a Firewire port 334 of DPD 302 and these conductors may be connected to a Firewire connector 324 on IPSM 308. As yet another example, the subset of conductors represented by reference number 308 may carry DVI data from a DVI port 336 of DPD 302 and these conductors may be connected to a DVI connector 320 on IPSM 308.

Conductors 312 and 314 may be employed to carry power from the power adapter circuitry in IPSM 308 to the power distribution circuitry within DPD 302 as shown. For aesthetics and to reduce clutter, the individual conductors of the set of flexible conductors 306 may be physically bundled together (such as wrapped in a common insulator).

Figure 4A:
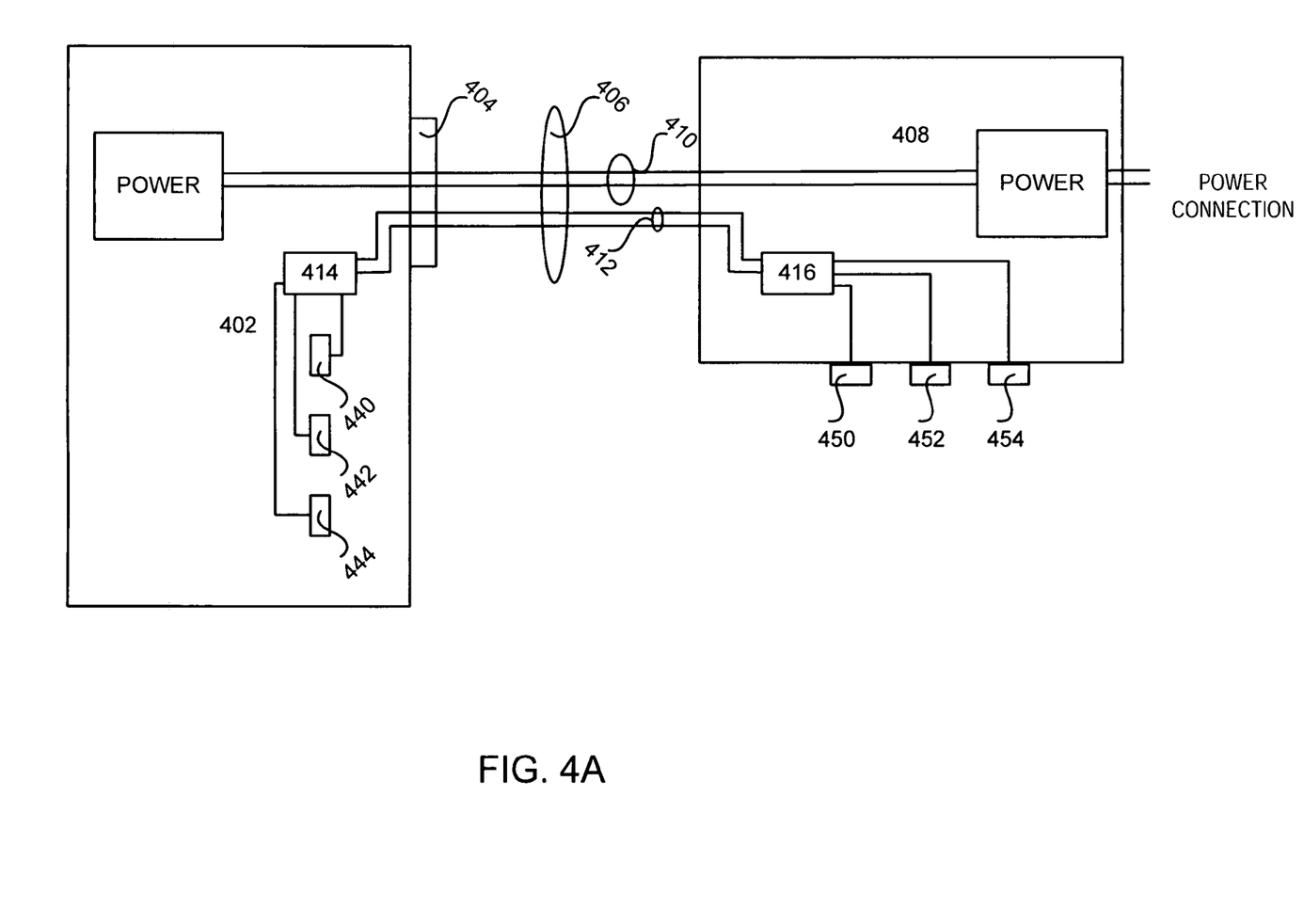
FIG. 4A shows, in an embodiment, data transmission between a data processing device and an IPSM is accomplished using a high speed protocol that may be different from the protocols associated with the ports from whence the data originates.

Another approach for transferring data between the IPSM and a data processing device is illustrated in FIG. 4A. In FIG. 4A, data transmission between DPD 402 and IPSM 408 is accomplished using a high speed protocol that may be different from the protocols associated with the ports from whence the data originates. Consider for example DPD 402 has three ports: a USB port 440, a Firewire port 442, and a DVI port 444. In the prior art, these three ports would have necessitated three on-board connectors to facilitate data transfer. Instead, the data from these three ports is transformed using a data a converter 414 into a high speed protocol such as high-speed Ethernet, high-speed USB, or high-speed Firewire.

The high speed protocol data is then transferred from DPD 402 to IPSM 408 using a connector 404 and a set of conductors 412. Connector 404 comprises detachable male and female parts to enable DPD 402 to detachably couple with the set of flexible conductors 406. At IPSM 408, a converter 416 converts the high speed protocol data back to the native protocols (e.g., USB, Firewire, and DVI in this example) for transmission to external data sources via industry-standard connectors (e.g., USB connector 450, Firewire connector 452, and DVI connector 454).

Note that although the data transfer involves data from three different ports and three different protocols, only fewer than three connectors are required at DPD 402. The three industry-standard protocols required for compatibility and interoperability are moved from DPD 402 to IPSM 408 (shown as connectors 450, 452, and 454 on IPSM 408). In the example of FIG. 3, only a single mating connector 404 is employed to transfer data associated with the three ports (e.g., USB port 440, Firewire port 442, and DVI port 444). It is possible to use more than one connector to transfer the high protocol data after conversion. If fewer connectors are required, user friendliness is improved even if more than one data connector is employed. Further, although FIG. 3 shows that power and data are coupled to DPD 402 via a single connector, it is also possible to use a different connector for power and a reduced set of one or more physical connectors for data. For aesthetics and to reduce clutter, power conductors 410 and data conductors 412 of the set of flexible conductors 406 maybe physically bundled together, as discussed.

Figure 4B:
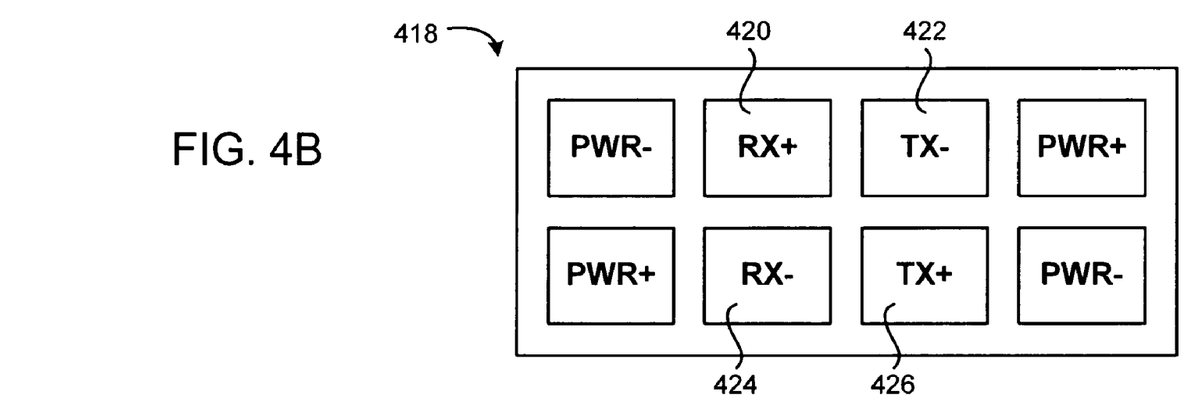
FIG. 4B shows, in an embodiment, a connector that provides both power and a high speed Ethernet data coupling between an IPD and an IPSM.
Figure 4C:
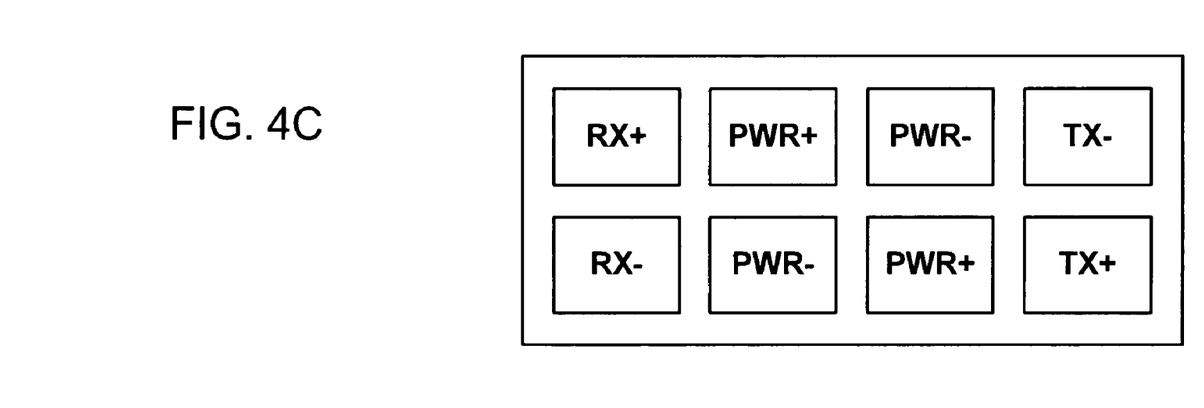
FIG. 4C shows, in an embodiment, an alternative reversible connector as shown in FIG. 4B.

FIG. 4B shows, in an embodiment, an implementation of connector 404 of FIG. 4A. In the example of FIG. 4B, a connector 418 provides both power and a high speed Ethernet data coupling between the IPD and the IPSM. More specifically, connector 418 is implemented as a reversible high speed Ethernet connector that is configured to operate irrespective of plug orientation. The high-speed Ethernet data transfer involves four pins (420, 422, 424, and 426) that are reversible. Since some Ethernet implementations have the ability to sense the transmit and receive lines, and to switch them if necessary, connector 418 is reversible with respect to the data pins. As is apparent, the power pins are also reversible, rendering the entire connector 418 reversible with respect to both the data and the power pins. An alternative reversible embodiment is shown in FIG. 4C.

Figure 4D:
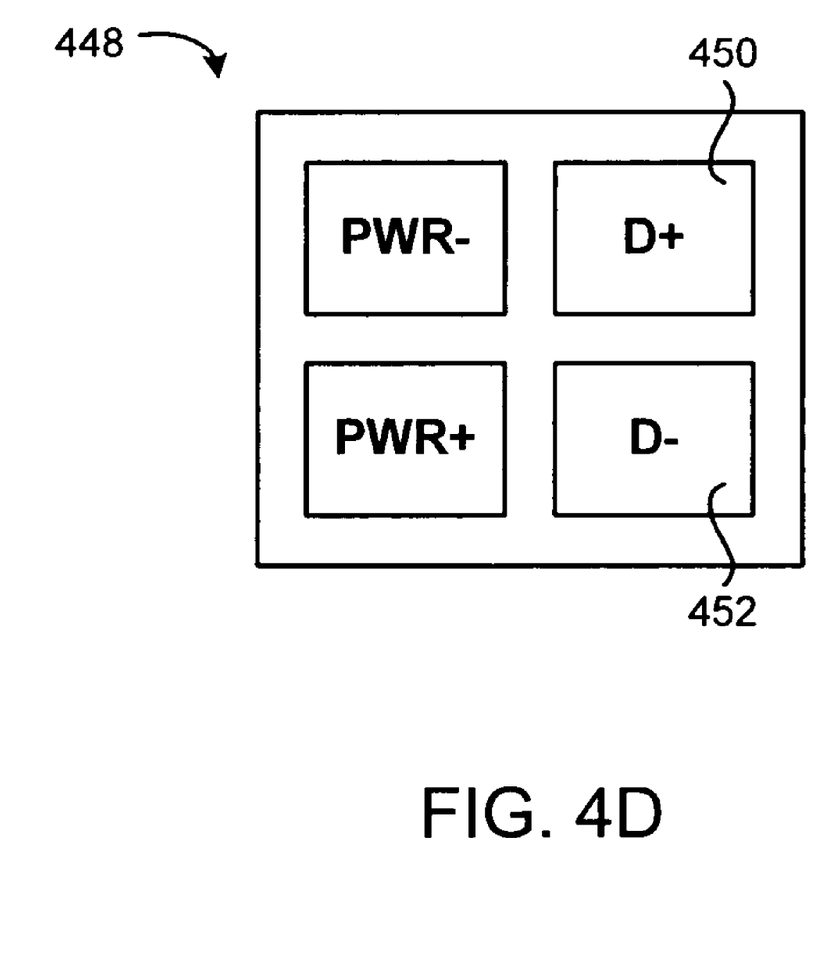
FIG. 4D shows, in an embodiment, an example of a connector that integrates high speed USB data transfer and power between an IPSM and a DPD.

Another embodiment is illustrated in FIG. 4D. FIG. 4D shows an example of a connector 448 that integrates high speed USB data transfer and power between the IPSM and the DPD. The high-speed USB signals are carried by pins 450 and 452, while power is carried by the remaining pins. The USB data conductors may be wound together to cancel electromagnetic interference while high speed USB data is being transferred between the IPSM and the DPD. Although FIGS. 4B, 4C, and 4D show some example reversible connectors, other reversible embodiments based on the same approach are possible, including embodiments employing linear or circular pins.

Figure 5:
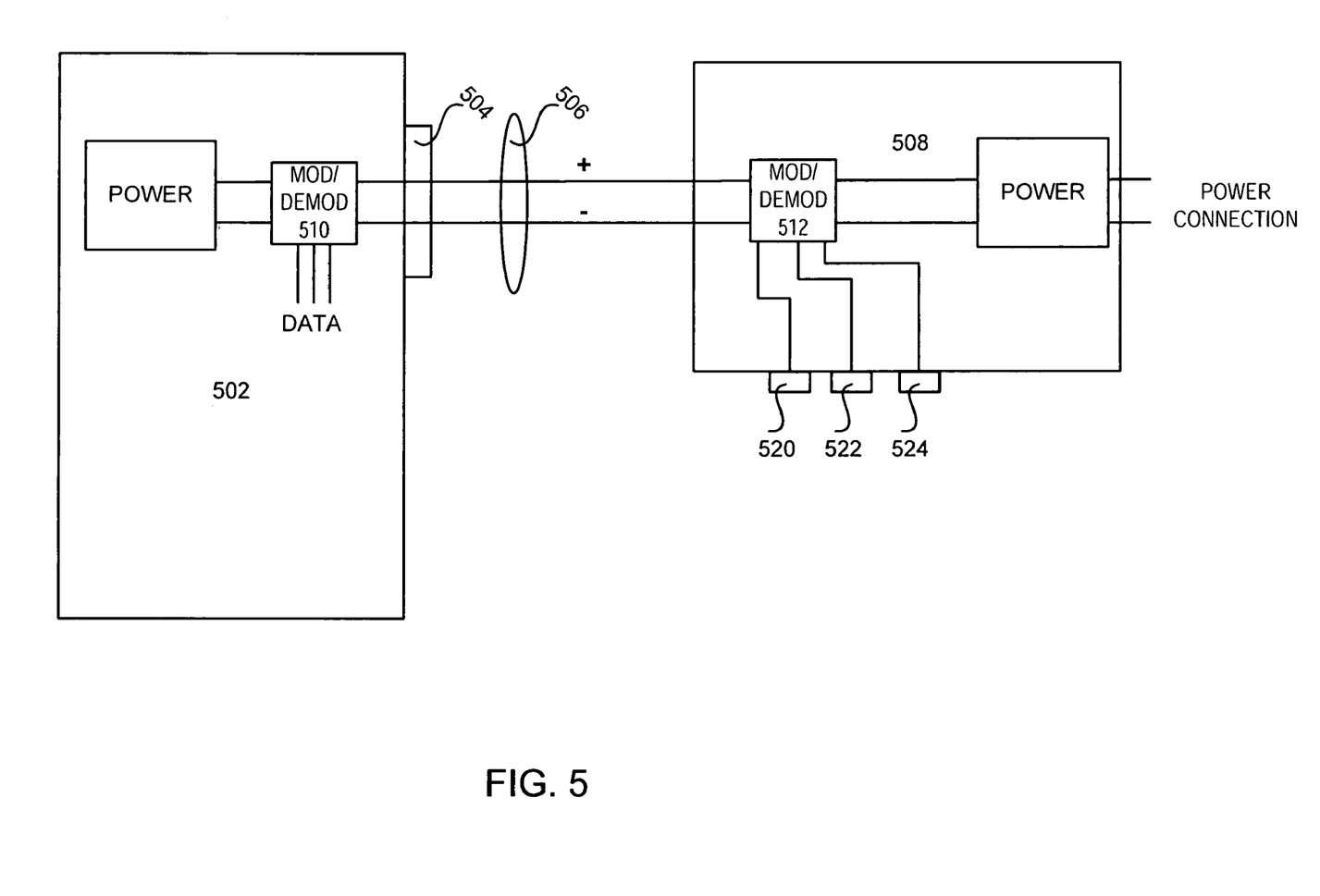
FIG. 5 shows, in an embodiment, data being transferred between an IPSM and a DPD over the same individual conductors that are also employed to carry power.

FIG. 5 shows, in an embodiment, data being transferred between an IPSM and a DPD over the same individual conductors that are also employed to carry power. Data from various ports within DPD 502 are modulated (e.g., either frequency, amplitude, or phase modulated) using a mod/demod circuit 510 onto the same individual conductors 506 that are employed to carry power. At IPSM 508, a mod/demod circuit 512 extracts the data for transmission to external data sources via industry-standard connectors 520, 522, and 524. Since the data signals are modulated onto the power conductors, the same power connector 504 may be employed to carry data. Although not shown in FIG. 5, converters may also be employed in the DPD and the IPSM to convert the native protocols into a higher speed protocol (and vice versa) to facilitate higher speed transfer between DPD 502 and IPSM 508.

Figure 6:
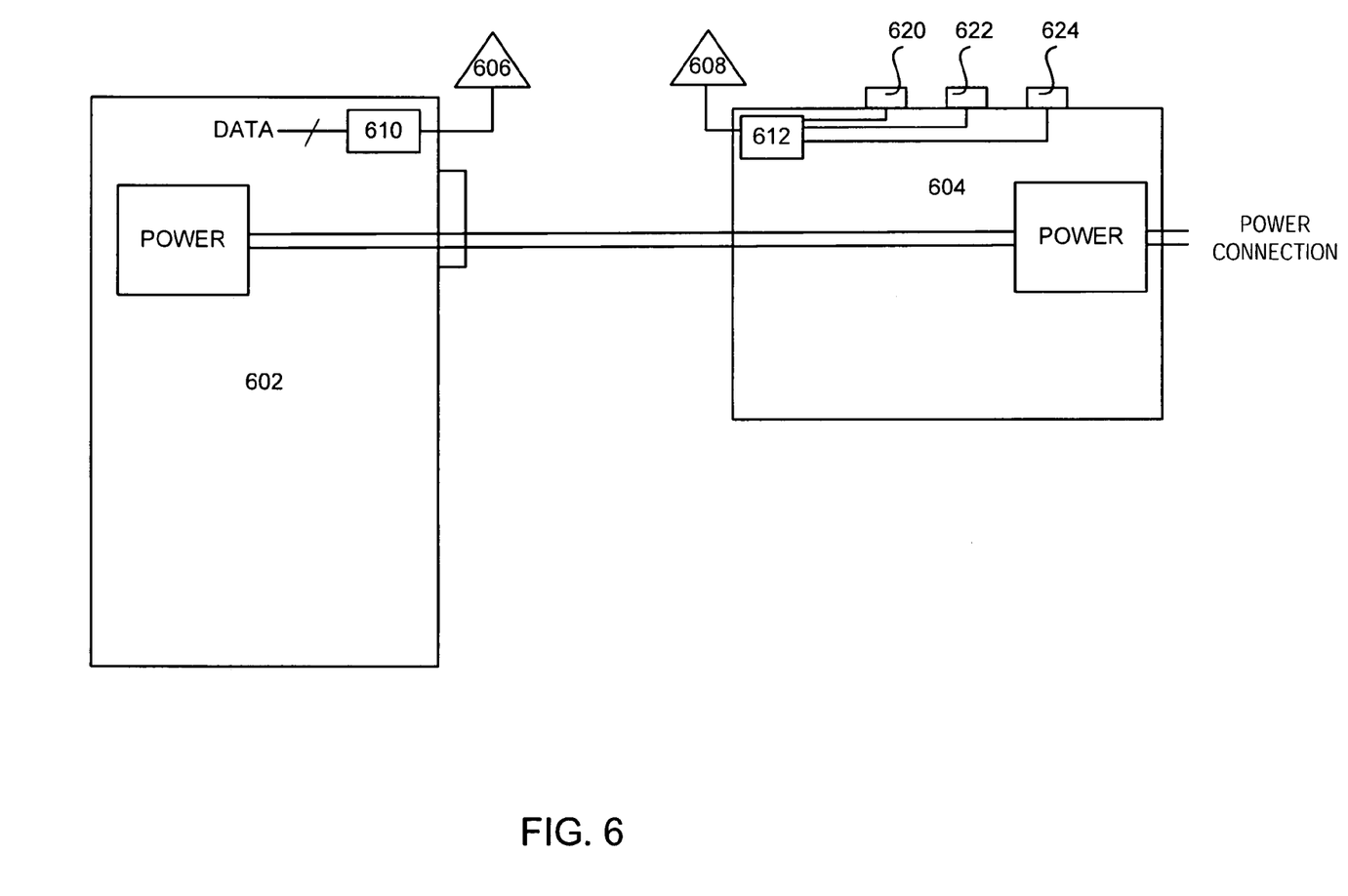
FIG. 6 shows, in an embodiment, a data processing device and an IPSM coupled to receive power in a conventional manner.

In another embodiment, data may be wirelessly transferred between a data processing device and an IPSM. FIG. 6 shows a data processing device 602 and an IPSM 604 coupled to receive power in a conventional manner. Data transmission between data processing device 602 and IPSM 604 is accomplished using wireless transceivers 606 and 608, which may be externally or internally located (either fully or partially) on data processing device 602 and IPSM 604. Within both data processing device 602 and IPSM 604 are modulators/demodulators 610 and 612, which are coupled to wireless transceivers 606 and 608 respectively.

Modulator/Demodulator 610 converts the data from various ports of DPD 602 to be converted to a format suitable for wireless transmission via wireless transceiver 606. At IPSM 604, the data is received via wireless transceiver 608 and converted by modulator/demodulator 612 back to the native protocols for transfer via example industry-standard connectors 620, 622, and 626 (which may be associated with the same protocol or different protocols). Although not shown in FIG. 5, converters may also be employed in the DPD and the IPSM to convert the native protocols into a higher speed protocol (and vice versa) to facilitate higher speed transfer between DPD 502 and IPSM 508.

Figure 7:
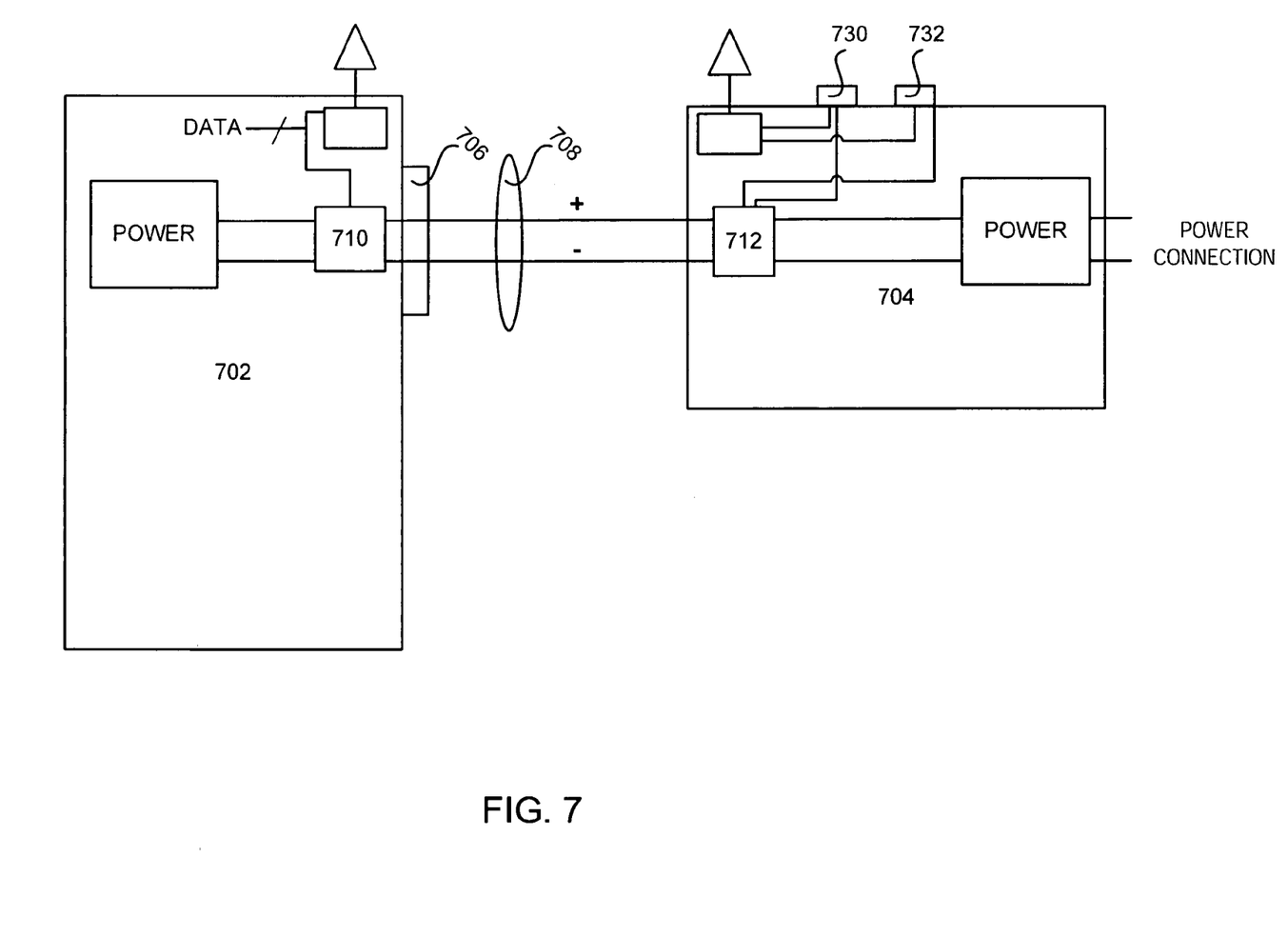
FIG. 7 illustrates, in an embodiment, a hybrid approach for transmitting and receiving data between a data processing device and an IPSM.

FIG. 7 illustrates, in an embodiment, a hybrid approach for transmitting and receiving data between a data processing device and an IPSM. This embodiment is a hybrid of the embodiments described in FIG. 5 and FIG. 6. When flexible conductors 708 are detached from connector 706 (such as the case when DPD 702 operates on battery power), data transmission takes place wirelessly in the manner discussed in connection with FIG. 6. When flexible conductors 708 are coupled with connector 706 to provide power from IPSM 704 to DPD 702, data transmission takes place via flexible conductors 708 in the manner described earlier in connection with FIG. 5 (i.e., the data is modulated onto the power conductors for transmission between the IPSM and the DPD). In an embodiment, when flexible conductors 708 are coupled with connector 706, data transmission may simultaneously be transmitted via flexible conductors 708 in the manner described earlier in connection with FIG. 5 and wirelessly in the manner discussed in connection with FIG. 6. If both methods of data transmission are occurring simultaneously, the rate of data flow may increase.

In the cases mentioned above, the result is fewer physical connectors and reduced clutter at DPD 702. The industry-standard connectors required for interoperability (e.g., 730 and 732) have been moved to IPSM 704. Note that although FIG. 7 employs the data/power overlay technique discussed in connection with FIG. 5 to accomplish the data transmission when flexible conductors 708 are coupled with connector 706, the data transmission that occur over flexible conductors 708 may employ any one or more of the various non-wireless data transmission techniques discussed herein. For example, flexible conductors 708 may employ additional data-carrying conductors (which may carry the data in their native protocols or in a protocol adapted for IPD-IPSM transmission) so as to render it unnecessary to modulate data onto the power conductors.

In an embodiment, a hybrid approach to the method for transmitting and receiving data between a data processing device and an IPSM is not limited to a wireless and a non-wireless combination. The hybrid approach may include various combinations of the methods mentioned herein, depending upon the bandwidth of the data to be transmitted, the target system cost, and the data conversion scheme. For example, DVI signals use a very high bandwidth medium and may be unlikely to be carried over other data protocols (e.g., USB) in a cost-effective manner. Instead, the DVI signals may be transmitted over a direct-connect wiring as shown in FIG. 3 and the other data types that require lower bandwidth may be transmitted via the other methods mentioned (such as those described in FIG. 4A and FIG. 5).

There are several advantages to embodiments of this invention. By relocating the connectors to the IPSM, the clutter or "cable mess" has been removed from the user's workspace enabling the user to have a cleaner workspace. Also, the size of a data processing device is no longer dictated by the number and/or types of external devices and/or data protocols that the data processing device may need to support. With the present invention, a palmtop computer may easily support the same number of data connections as that supported by a much larger laptop computer. Since the industry-standard connectors that are required for interoperability are moved to the IPSM, the palmtop computer of the present example may support a very large set of protocols even though there is not room onboard the palmtop computer itself to accommodate all the associated industry-standard connectors if all the associated industry-standard connectors were required to be onboard the palmtop computer. Instead, the data transmission may be handled by a single high speed connector to the IPSM or via a wireless path to the IPSM, with the remote IPSM housing the industry-standard connectors for interoperability purposes.

While this invention has been described in terms of several embodiments, there are alterations, permutations, and equivalents, which fall within the scope of this invention. For example, although the examples in the figures discuss data transmission via conductors, such data transmission may also take place via optical fibers between the IPSM and the DPD. As another example, although only a few example protocols are specifically mentioned in the illustrations, the invention is not limiting with respect to the number and/or types of protocols that can be supported. As a further example, techniques disclosed in connection with the figures and discussions herein may be combined to offer advantageous target system cost, overall bandwidth and/or to suit market requirements. For example, a DPD that is coupled to an external video device using DVI may use a DVI cable and the DVI protocol to transmit data with the external video device (e.g., in the manner discussed in connection with FIG. 3) while using wireless or USB or another protocol to transmit (between the DPD and the IPSM) other data intended for other devices (e.g., in the manner discussed in connection with FIG. 4A, 5, or 6). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A power supply module configured to be coupled to a power outlet to supply an operating voltage to a data processing device, the power supply module comprising:

a set of signal connectors having at least a first signal connector, said set of signal connectors being configured to provide at least a portion of data received from said data processing device to devices external to said data processing device and external to said power supply module, wherein said power supply module is disposed in a flexibly-coupled, spaced-apart relationship relative to said data processing device.

2. The power supply module of claim 1 further comprising logic circuitry for receiving said data from said data processing device.

3. The power supply module of claim 2 wherein said logic circuitry for receiving data includes a demodulator.

4. The power supply module of claim 2 wherein said data is transmitted from said data processing device using a wireless transceiver, said logic circuitry for receiving data includes wireless data receiving circuitry.

5. The power supply module of claim 1 wherein said data is transmitted from said data processing device to said power supply module using conductors configured to provide said operating voltage to said data processing device, said power supply module further includes circuitry for extracting said data transmitted using said conductors.

6. The power supply module of claim 1 wherein said data is transmitted from said data processing device to said power supply module via one of a first mode and a second mode with circuitries for performing both said first mode and said second mode being provided on said power supply module, said first mode employing at least one same conductor both to provide said operating voltage to said data processing device and to transmit at least a portion of said data between said power supply module and said data processing device, said second mode transmitting said data wirelessly between said power supply module and said data processing device.

7. The power supply module of claim 6 wherein said first mode is employed for transmitting said data when said power supply module is coupled with said data processing device via said at least one same conductor, said second mode is employed for transmitting said data when said power supply module not physically connected to said data processing device.

8. The power supply module of claim 1 wherein said data is transmitted from said data processing device to said power supply module via both a first mode and a second mode with circuitries for performing both said first mode and said second mode being provided on said power supply module, said first mode employing at least one same conductor both to provide said operating voltage to said data processing device and to transmit at least a first portion of said data between said power supply module and said data processing device, said second mode transmitting at least a second portion of said data wirelessly between said power supply module and said data processing device.

9. The power supply module of claim 1 wherein said data processing device is coupled to said power supply module via a reversible connector.

10. The power supply module of claim 9 wherein said reversible connector carries at least a portion of said data using an Ethernet protocol.

11. The power supply module of claim 1 wherein at least a portion of said data is transmitted between said data processing device and said power supply module using a USB protocol.

12. The power supply module of claim 1 wherein said set of signal connectors including connectors associated with at least two different protocols.

13. The power supply module of claim 1 wherein said set of signal connectors including at least two of an Ethernet connector, a USB connector, a Firewire connector, and a video connector.

14. The power supply module of claim 1 further including circuitries for converting data received from said set of signal connectors to a protocol configured for transmission to said data processing device.

15. The power supply module of claim 1 wherein said data processing device is a laptop computer.

16. A method for transmitting data between a data processing device and a plurality of external devices that employ a plurality of protocols for data transfer, the method comprising:

providing a power supply module, said power supply module being external to said data processing device and configured to be coupled to a power outlet to supply at least one operating voltage via a first flexible conductor to said data processing device, said operating voltage being different from a voltage associated with said power outlet, said power supply module being disposed in a flexibly-coupled, spaced-apart relationship relative to said data processing device, said power supply module further having a plurality of connectors configured for coupling with said plurality of external devices, said plurality of external devices being external to said power supply module; and transmitting said data from said data processing device to said plurality of connectors on said power supply module, thereby enabling said data to be transmitted to said plurality of plurality of external devices via said plurality of connectors.

17. The method of claim 16 wherein said data is associated with said plurality of protocols, said transmitting said data from said data processing device to said plurality of connectors on said power supply module includes convening, using circuitry in said data processing device, said data to conform to a protocol configured for transmission between said data processing device and said power supply module.

18. The method of claim 17 wherein said protocol configured for transmission between said data processing device and said power supply module represents a USB protocol.

19. The method of claim 17 wherein said protocol configured for transmission between said data processing device and said power supply module represents an Ethernet protocol.

20. The method of claim 16 further comprising providing a reversible connector with said data processing device, said data being transmitted between said data processing device and said power supply module via said reversible connector.

21. The method of claim 20 wherein said reversible connector carries at least a portion of said data using an Ethernet protocol.

22. The method of claim 20 wherein said reversible connector carries at least a portion of said data using a USB protocol.

23. The method of claim 16 wherein said transmitting said data from said data processing device to said plurality of connectors on said power supply module includes modulating said data prior to said transmitting.

24. The method of claim 16 wherein said transmitting said data from said data processing device to said power supply module is performed in a wireless manner.

25. The method of claim 16 wherein at least a portion of said data transmitted from said data processing device to said power supply module is performed via said first flexible conductor.

26. The method of claim 16 wherein said transmitting said data from said data processing device to said power supply module is accomplished via one of a first mode and a second mode with circuitries for performing both said first mode and said second mode being provided on said power supply module, said first mode employing at least said first flexible conductor both to provide said operating voltage to said data processing device and to transmit at least a portion of said data between said power supply module and said data processing device, said second mode transmitting said data wirelessly between said power supply module and said data processing device.

27. The method of claim 26 wherein said first mode is employed for transmitting said data when said power supply module is coupled with said data processing device via said first flexible conductor, said second mode is employed for transmitting said data when said power supply module not physically connected to said data processing device.

28. The method of claim 16 wherein said transmitting said data from said data processing device to said power supply module is accomplished via both a first mode and a second mode with circuitries for performing both said first mode and said second mode being provided on said power supply module, said first mode employing at least said first flexible conductor both to provide said operating voltage to said data processing device and to transmit at least a first portion of said data between said power supply module and said data processing device, said second mode transmitting at least a second portion of said data wirelessly between said power supply module and said data processing device.

29. The method of claim 16 wherein said data processing device is a laptop computer.

* * * * *